(12) United States Patent
Grant

(10) Patent No.: US 11,999,274 B2
(45) Date of Patent: Jun. 4, 2024

(54) VEHICLE HAVING A FOLDING MID-GATE WITH AN INTEGRATED SEAT

(71) Applicant: GM Global Technology Operations LLC, Detroit, MI (US)

(72) Inventor: Douglas Anthony Grant, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/713,445

(22) Filed: Apr. 5, 2022

(65) Prior Publication Data
US 2023/0311724 A1    Oct. 5, 2023

(51) Int. Cl.
*B60N 2/36* (2006.01)
*B60N 2/30* (2006.01)

(52) U.S. Cl.
CPC ............ *B60N 2/36* (2013.01); *B60N 2/3072* (2013.01); *B60N 2/3002* (2013.01)

(58) Field of Classification Search
CPC .... B60N 2/3013; B60N 2/36; B62D 33/0273; B62D 33/03
See application file for complete search history.

(56) References Cited

U.S. PATENT DOCUMENTS

| | | | | |
|---|---|---|---|---|
| 4,480,868 A * | 11/1984 | Koto | ..................... | B60N 2/3095 297/335 |
| 4,750,778 A * | 6/1988 | Hoban | ..................... | B60N 2/02 296/107.17 |
| 5,934,727 A * | 8/1999 | Storc | ................... | B62D 33/0273 296/26.11 |
| 6,398,291 B1 * | 6/2002 | Reusswig | .............. | B60N 2/882 296/183.1 |
| 6,447,039 B1 * | 9/2002 | Song | ......................... | B60P 3/40 296/100.07 |
| 6,478,368 B1 * | 11/2002 | de Gaillard | ............ | B60J 7/1642 296/216.02 |
| 6,513,863 B1 * | 2/2003 | Renke | ..................... | B60P 3/423 296/57.1 |
| 6,786,535 B1 * | 9/2004 | Grzegorzewski | .... | B60N 2/3013 296/37.16 |
| 7,036,872 B1 * | 5/2006 | Czirmer | ................. | B60J 1/1861 296/26.11 |
| 7,246,847 B2 * | 7/2007 | Polewarczyk | ............. | B60J 5/00 296/190.11 |

(Continued)

FOREIGN PATENT DOCUMENTS

| | | |
|---|---|---|
| DE | 60206818 T2 | 12/2005 |
| DE | 102010042439 A1 | 5/2011 |

(Continued)

*Primary Examiner* — Jason S Morrow
(74) *Attorney, Agent, or Firm* — CANTOR COLBURN LLP

(57) ABSTRACT

A vehicle including a passenger compartment and a cargo area extending from the passenger compartment. The cargo area includes a cargo bed having a support surface. A mid-gate includes a first surface exposed to the passenger compartment and a second surface exposed to the cargo area. The mid-gate is pivotally connected relative to the cargo bed between a first position wherein the mid-gate separates the cargo area from the passenger compartment and a second position wherein the second surface forms part of the support surface.

20 Claims, 4 Drawing Sheets

(56) References Cited

U.S. PATENT DOCUMENTS

| | | | | |
|---|---|---|---|---|
| 7,566,094 | B2* | 7/2009 | Polewarczyk | B60J 1/1861 |
| | | | | 296/190.11 |
| 7,762,621 | B2* | 7/2010 | Duller | B60N 2/3011 |
| | | | | 296/190.11 |
| 7,845,712 | B2* | 12/2010 | Gordon | B60J 10/80 |
| | | | | 296/190.11 |
| 10,350,972 | B2* | 7/2019 | Azzouz | B60J 5/00 |
| 11,565,645 | B2* | 1/2023 | Salter | B60P 3/341 |
| 2002/0079715 | A1* | 6/2002 | Hong | B60P 7/135 |
| | | | | 296/26.11 |
| 2004/0195888 | A1* | 10/2004 | Frye | B60N 2/3013 |
| | | | | 297/354.1 |
| 2006/0076802 | A1* | 4/2006 | Voelkert | B60J 1/1861 |
| | | | | 296/190.11 |
| 2009/0039675 | A1* | 2/2009 | King | B60P 3/423 |
| | | | | 296/182.1 |
| 2013/0328341 | A1 | 12/2013 | Maguire et al. | |
| 2022/0177052 | A1* | 6/2022 | Harmon | B60P 3/341 |

FOREIGN PATENT DOCUMENTS

| | | | |
|---|---|---|---|
| DE | 202017105430 U1 | 9/2017 | |
| EP | 1508463 A1 * | 2/2005 | E05D 7/121 |

\* cited by examiner

VEHICLE HAVING A FOLDING MID-GATE WITH AN INTEGRATED SEAT

INTRODUCTION

The subject disclosure relates to the art of vehicles and, more particularly to a vehicle having a folding mid-gate with an integrated seat.

Pickup trucks typically include a passenger compartment and a cargo bed that are separated by a mid-gate. Often times, a rear passenger seat is arranged directly adjacent to the mid-gate. In most cases, the mid-gate supports a rear window. In certain trim packages, a portion of the rear window may slide open. The rear window may be slid manually or through the use of an electric motor. In other trim packages, the rear window may be completely removed to extend an effective length of the cargo bed.

Removing the rear window presents a number of challenges. First, the rear passenger seat is manipulated in order to gain access. Then the rear window is released and lowered from the mid-gate. Due to the weight of the rear window, this step is not practical for all users. Once the rear window has been lowered, it must be protected and stowed. Even after all this effort, there are but a limited number of objects that can be passed from the cargo bed into the passenger compartment due to the dimensions of the rear window. Accordingly, it is desirable to provide a system that expands cargo carrying capacity of a cargo bed without the need for complicated repositioning of components.

SUMMARY

Disclosed, in accordance with a non-limiting example, is a vehicle including a passenger compartment and a cargo area extending from the passenger compartment. The cargo area includes a cargo bed having a support surface. A mid-gate includes a first surface exposed to the passenger compartment and a second surface exposed to the cargo area. The mid-gate is pivotally connected relative to the cargo bed between a first position wherein the mid-gate separates the cargo area from the passenger compartment and a second position wherein the second surface forms part of the support surface.

In addition to one or more of the features described herein the mid-gate includes a first end and a second end that is opposite the first end, the second end being pivotally connected relative to the support surface through a hinge.

In addition to one or more of the features described herein the support surface includes a first end portion arranged at the passenger compartment and a second end portion, the second end of the mid-gate being pivotally connected to the first end portion of the support surface.

In addition to one or more of the features described herein the hinge comprises a piano hinge connecting the second end of the mid-gate with the first end portion of the support surface.

In addition to one or more of the features described herein a window is arranged adjacent the mid-gate, the window separating the passenger compartment and the cargo area.

In addition to one or more of the features described herein the window includes a first end section and a second end section that is opposite the first end section, the second end section being arranged adjacent the mid-gate.

In addition to one or more of the features described herein the first end of the mid-gate overlaps the second end section of the window.

In addition to one or more of the features described herein the first end section of the window is pivotally mounted relative to the passenger compartment, the window being shiftable between a closed configuration and an open configuration.

In addition to one or more of the features described herein the passenger compartment includes a ceiling supporting a latch that engages the second end section to secure the window in the open configuration.

In addition to one or more of the features described herein a mid-gate motor is operatively connected to the mid-gate, the mid-gate motor selectively pivoting the mid-gate about the second end.

In addition to one or more of the features described herein a window motor is operatively connected to the window, the window motor selectively rotating the window about the first end section.

In addition to one or more of the features described herein a controller is operatively connected to the mid-gate motor and the window motor, the controller sequentially shifting the mid-gate about the first end and the window about the first end section.

In addition to one or more of the features described herein an actuator is operatively connected to the controller, the actuator being activated to signal the controller to shift the mid-gate and the window.

In addition to one or more of the features described herein the actuator is mounted to the mid-gate.

In addition to one or more of the features described herein a seatback is mounted to the first surface of the mid-gate.

In addition to one or more of the features described herein the mid-gate includes a first section supporting a first portion of the seatback and a second section supporting a second portion of the seatback.

Further disclosed in accordance with a non-limiting example is a method of configuring a passenger compartment of a vehicle including a cargo bed having a support surface including folding a rear window upwardly, and folding a mid-gate downwardly such that a rear surface of the mid-gate is substantially co-planar with the support surface.

In addition to one or more of the features described herein, the method includes securing the window with a latch mounted to a ceiling of the passenger compartment.

In addition to one or more of the features described herein the method includes folding a seat base forward.

In addition to one or more of the features described herein the method includes activating a mid-gate motor and a window motor to fold the rear window and the mid-gate.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
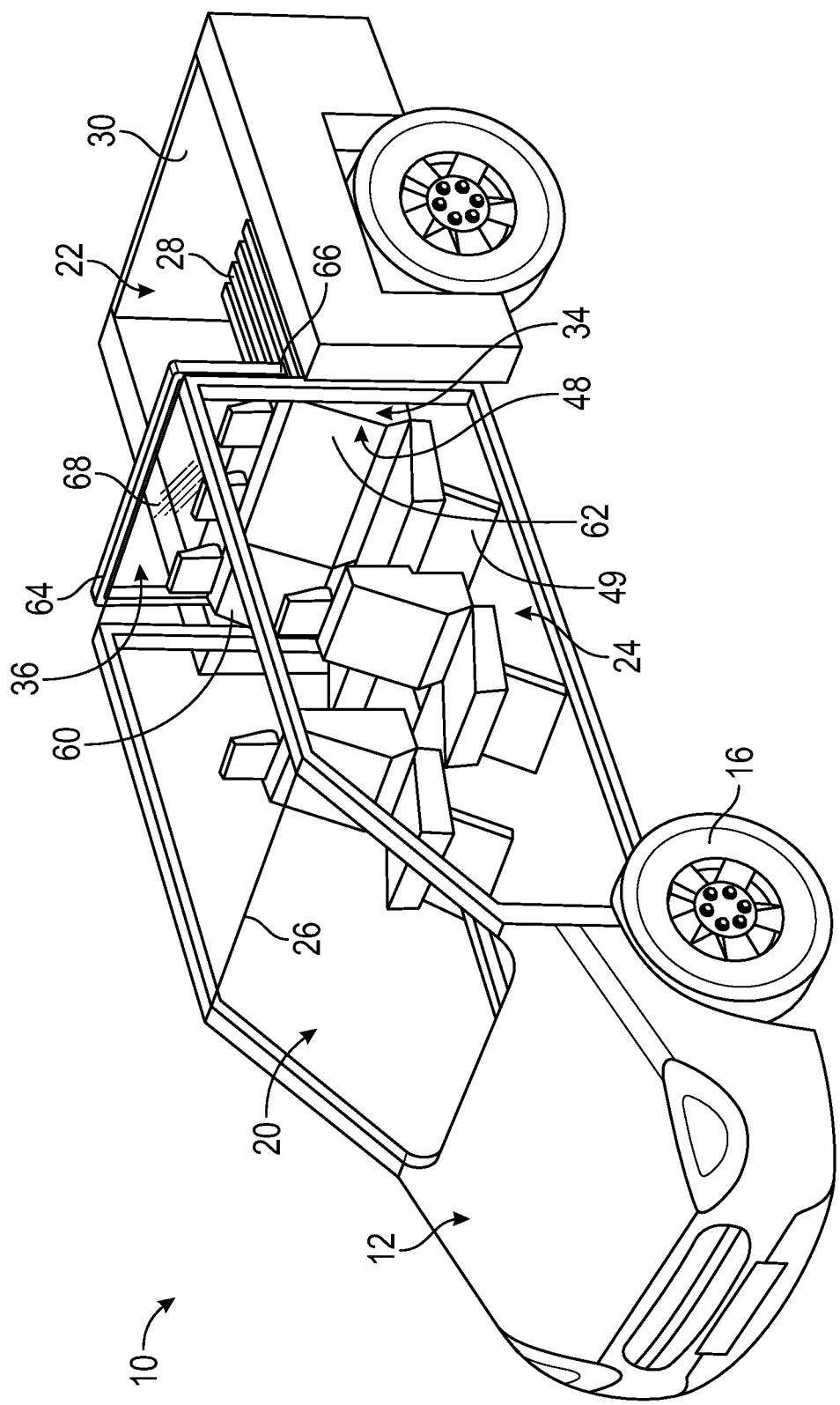
FIG. 1 is a schematic perspective view of a vehicle including a folding mid-gate having an integrated seat, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated at 10 in FIG. 1. Vehicle 10 includes a body 12 that is supported by a frame (not shown) and a plurality of wheels, one of which is indicated at 16. Vehicle 10 includes a passenger compartment 20 and cargo area 22. Passenger compartment 20 includes a plurality of seats 24 and a ceiling 26. Cargo area 22 includes a support surface or cargo bed 28. Cargo area 22 may also include a tail gate 30. In a non-limiting example, passenger compartment 20 is separated from cargo area 22 by a folding mid-gate 34 and a window 36.

Figure 2:
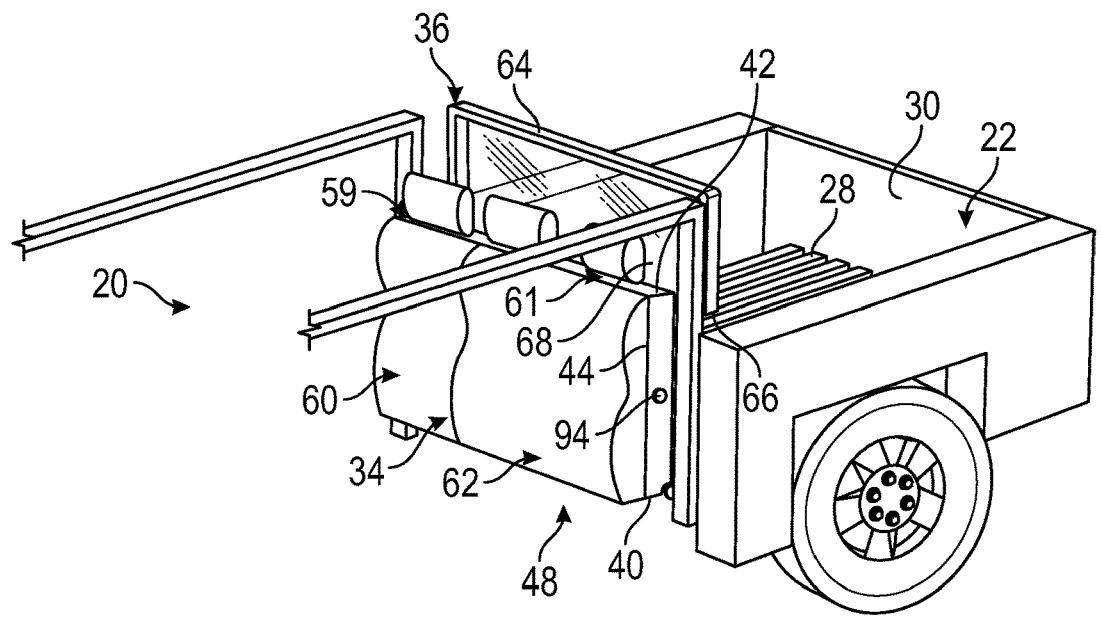
FIG. 2 is a schematic perspective view of the folding mid-gate in a first configuration, in accordance with a non-limiting example.
Figure 3:
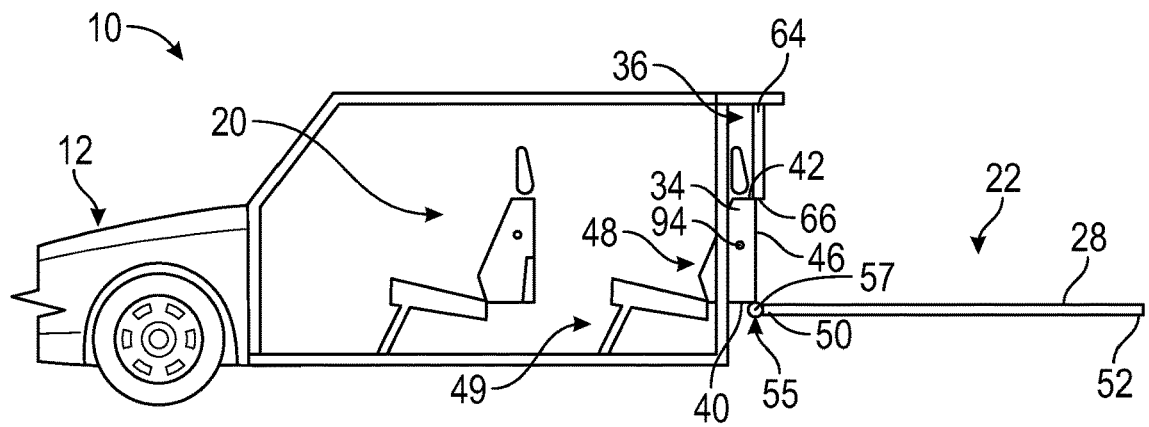
FIG. 3 is a schematic side view of the vehicle of FIG. 1, depicting the folding mid-gate in the first configuration, in accordance with a non-limiting example.

In a non-limiting example shown in FIGS. 2 and 3 and with continued reference to FIG. 1, mid-gate 34 includes a first end 40 and a second end 42. Second end 42 is opposite first end 40. Mid-gate 34 also includes a first surface 44 and a second surface 46. First surface 44 is selectively exposed in passenger compartment 20 and supports a seatback 48. A seat base 49 is positioned adjacent to seatback 48. Second surface 46 may become an extension of support surface 28 as will be detailed herein. That is, mid-gate 34 is pivotally mounted to vehicle 10. More specifically, support surface 28 includes a first end portion 50 (FIG. 3) arranged proximate to passenger compartment 20 and a second end portion 52 that is arranged at tail gate 30. In a non-limiting example, first end 40 of mid-gate 34 is connected to first end portion 50 of support surface 28 through a hinge 55. In a non-limiting example, hinge 55 is a piano hinge 57. In this manner, when folded forward, no gap exists between mid-gate 34 and support surface 28. In a non-limiting example, mid-gate 34 includes a first section 59 that supports a first portion 60 of seatback 48 and a second section 61 that supports a second portion 62 of seatback 48. First section 59 may represent 40% of a width of mid-gate 34 and second section 61 may represent 60% of the width of mid-gate 34.

Figure 8:
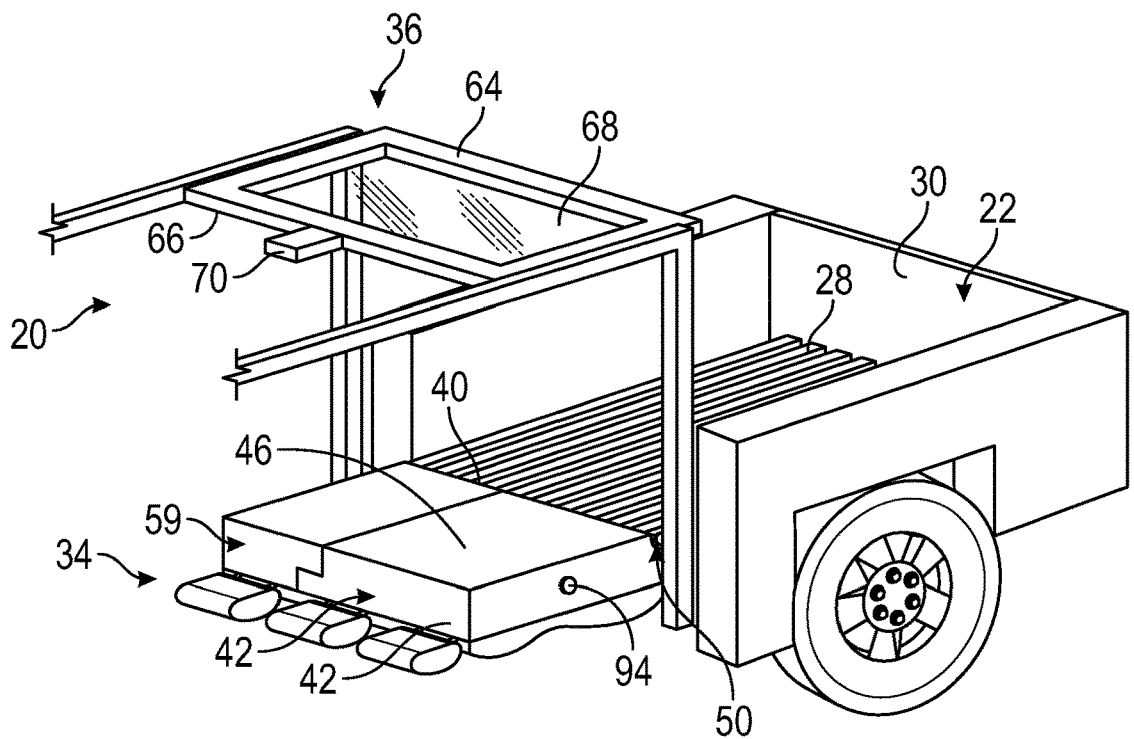
FIG. 8 depicts the window of FIG. 5 swinging upward, in accordance with a non-limiting example.

In a non-limiting example, window 36 is also pivotally mounted in passenger compartment 20. Window 36 includes a first end section 64 and a second end section 66 that is opposite first end section 64 as well as side sections (not separately labeled). First end section 64, second end section 66 and the side sections surround a glass pane 68. In a non-limiting example, first end section 64 of window 36 is pivotally connected to vehicle 10 in passenger compartment 20. With this arrangement, window 36 may pivot between a first configuration, wherein second end 42 of mid-gate 34 overlaps second end section 66, and a second configuration, wherein mid-gate 34 is rotated forward, and window 36 is pivoted upward as shown in FIG. 8 exposing passenger compartment 20 to cargo area 22. In a non-limiting example, vehicle 10 includes a latch 70 (FIG. 8) provided on ceiling 26. Latch 70 engages with second end section 66 to retain window 36 in the second configuration.

In a non-limiting example, mid-gate 34 and window 36 are arranged in the first configuration as shown in FIGS. 2 and 3 in which passenger compartment 20 and cargo area 22 are physically separated from one another. If additional cargo space is desired, such as if hauling lumber, kayaks, or the like, passenger compartment 20 and cargo area 22 may be connected. In order to connect passenger compartment 20 and cargo area 22 mid-gate 34 and window 36 are shifted to the second configuration as will be detailed herein.

Figure 4:
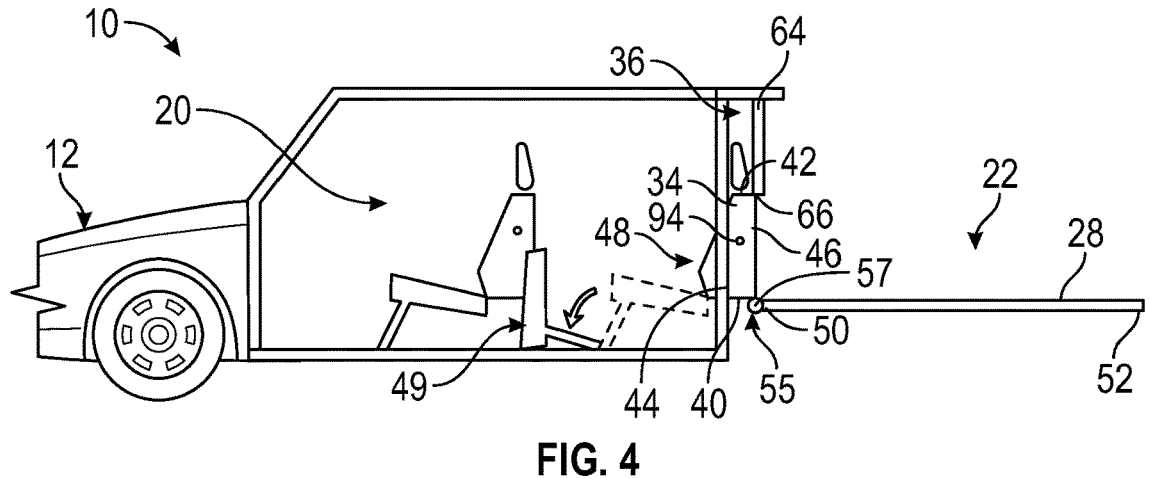
FIG. 4 is a schematic side view of the vehicle of FIG. 3 depicting a lower seat member folding forward, in accordance with a non-limiting example.
Figure 5:
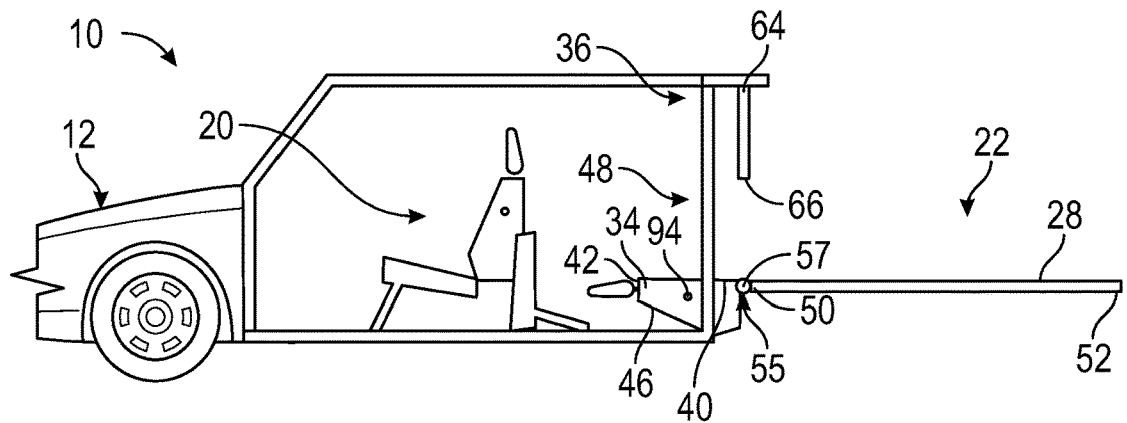
FIG. 5 is a schematic side view of the vehicle of FIG. 4 depicting the folding mid-gate folding forward into a second configuration, in accordance with a non-limiting example.
Figure 6:
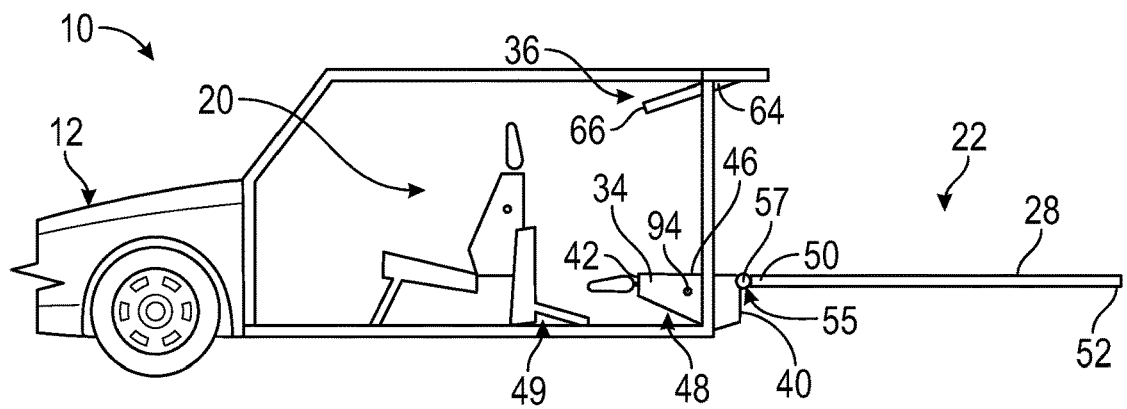
FIG. 6 depicts a side view of the vehicle of FIG. 5 depicting a window positioned above the folding mid-gate folding upward, in accordance with a non-limiting example.
Figure 7:
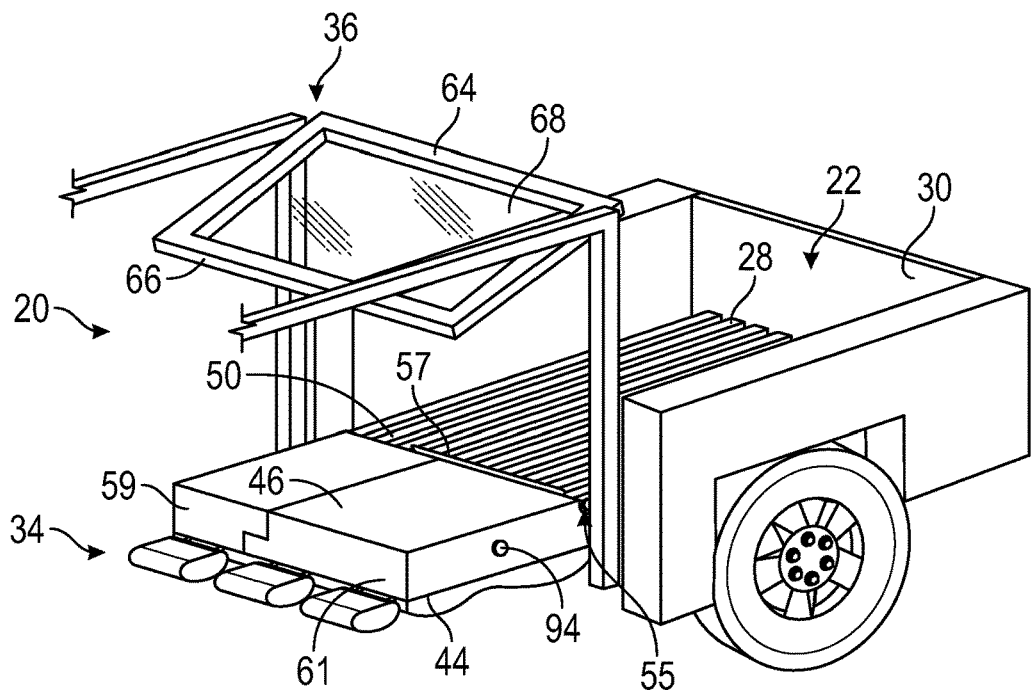
FIG. 7 depicts the folding mid-gate of FIG. 2 transitioning to the second configuration, in accordance with a non-limiting example.

As shown in FIG. 4, seat base 49 is rotated forward providing space for mid-gate 34. Mid-gate 34 may be rotated forward as shown in FIGS. 5 and 7. After folding mid-gate 34 forward, window 36 may be released and rotated upwardly as shown in FIGS. 6 and 8. At this point, passenger compartment 20 and cargo are 22 are physically connected with second surface 46 forming an extension of cargo bed 28. In this manner, support surface 28 has been effectively extended in order to accept longer loads.

Figure 9:
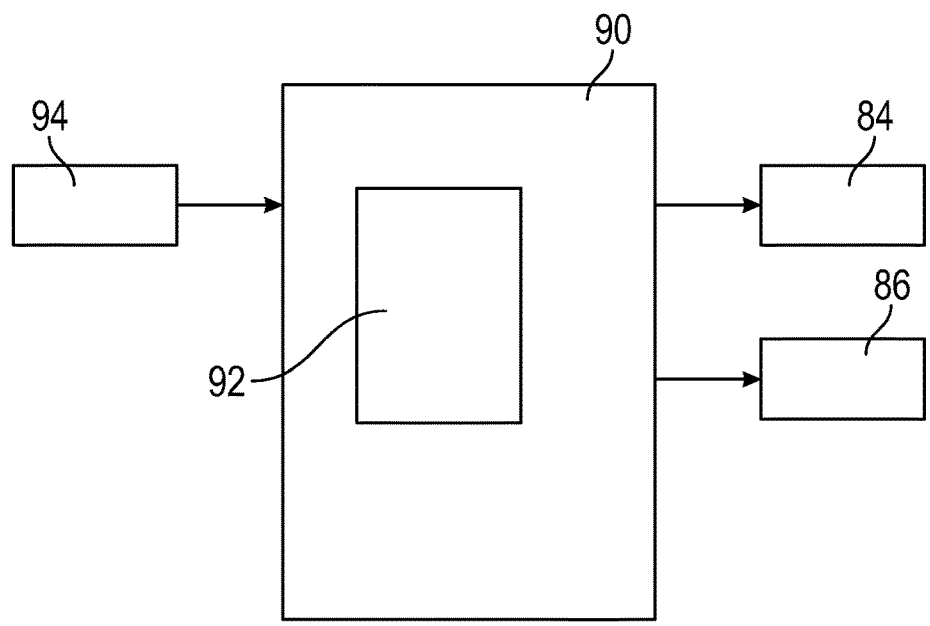
FIG. 9 is a block diagram depicting a motor controller connected to a folding mid-gate motor and a window motor, in accordance with a non-limiting example.

In a non-limiting example, vehicle 10 may include a hands-free option for shifting mid-gate 34 and window 36 between the first configuration and the second configuration. Referring to FIG. 9, and with continued reference to FIGS. 1-8, mid-gate 34 may be operatively connected to a mid-gate motor 84 and window 36 may be operatively connected to a window motor 86. In a non-limiting example, mid-gate motor 84 and window motor 86 are connected to a controller 90 having a motor control module 92. Motor control module 92 orchestrates the shifting of mid-gate 34 and window 36 between the first and second configurations as described herein.

An actuator 94 is connected to controller 90. Actuator 94 is mounted in passenger compartment 20. Actuator 94 may be part of an instrument system and/or infotainment system or, in a non-limiting example, mounted to a side (not separately labeled) of mid-gate 34 as shown in FIG. 2. If actuator 94 is activated, motor control module 92 signals mid-gate motor 84 to rotate mid-gate 34 and window motor 86 to rotate window 36 from the first configuration to the second configuration or from the second configuration to the first configuration. In addition to mid-gate motor 84 and window motor 86, vehicle 10 may include a seat base motor and a latch release (not shown) connected to controller 90.

At this point, it should be understood that the non-limiting examples described herein provide a system for easily physically connecting a passenger compartment and a cargo space of a vehicle. The physical connection may be made manually or, in a non-limiting example, be hands-free. The physical connection may include a substantially seamless surface defined by the support surface and the mid-gate created through the use of the hinge.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
a passenger compartment including a ceiling supporting a latch;
a cargo area extending from the passenger compartment, the cargo area including a cargo bed having a support surface;
a mid-gate including a first surface exposed to the passenger compartment and a second surface exposed to the cargo area, the mid-gate being pivotally connected relative to the cargo bed between a first position wherein the mid-gate separates the cargo area from the passenger compartment and a second position wherein the second surface forms part of the support surface, wherein when in the second position the support surface and the second surface of the mid-gate form a substantially continuous co-planar surface; and
a window arranged adjacent the mid-gate separating the passenger compartment and the cargo area, the window having a first end section and a second end section having a mid-point that is opposite the first end section, the second end section being arranged adjacent the mid-gate, wherein the first end section of the window is pivotally mounted relative to the passenger compartment, the window being shiftable between a closed configuration and an open configuration in the open position, the latch engages the mid-point of the second end section to secure the window in the open configuration.

2. The vehicle according to claim 1, wherein the mid-gate includes a first end and a second end that is opposite the first end, the second end being pivotally connected relative to the support surface through a hinge.

3. The vehicle according to claim 2, wherein the support surface includes a first end portion arranged at the passenger compartment and a second end portion, the second end of the mid-gate being pivotally connected to the first end portion of the support surface.

4. The vehicle according to claim 3, wherein the hinge comprises a piano hinge connecting the second end of the mid-gate with the first end portion of the support surface.

5. The vehicle according to claim 1, wherein the first end of the mid-gate overlaps the second end section of the window.

6. The vehicle according to claim 1, further comprising a mid-gate motor operatively connected to the mid-gate, the mid-gate motor selectively pivoting the mid-gate about the second end.

7. The vehicle according to claim 6, further comprising a window motor operatively connected to the window, the window motor selectively rotating the window about the first end section.

8. The vehicle according to claim 7, further comprising a controller operatively connected to the mid-gate motor and the window motor, the controller sequentially shifting the mid-gate about the first end and the window about the first end section.

9. The vehicle according to claim 8, further comprising an actuator operatively connected to the controller, the actuator being activated to signal the controller to shift the mid-gate and the window.

10. The vehicle according to claim 9, wherein the actuator is mounted to the mid-gate.

11. The vehicle according to claim 1, further comprising a seatback mounted to the first surface of the mid-gate.

12. The vehicle according to claim 11, wherein the mid-gate includes a first section supporting a first portion of the seatback and a second section supporting a second portion of the seatback.

13. A method of configuring a passenger compartment of a vehicle including a cargo bed having a support surface comprising:
folding a rear window upwardly;
folding a mid-gate downwardly such that a rear surface of the mid-gate and the support surface of the cargo bed form a substantially continuous co-planar surface; and
securing a mid-point of the window with a latch mounted to a ceiling of the passenger compartment.

14. The method of claim 13, further comprising folding a seat base forward.

15. The method of claim 13, further comprising: activating a mid-gate motor and a window motor to fold the rear window and the mid-gate.

16. A vehicle comprising:
a passenger compartment including a ceiling supporting a latch;
a cargo area extending from the passenger compartment, the cargo area including a cargo bed having a support surface;
a mid-gate arranged between the cargo area from the passenger compartment; and
a window arranged adjacent the mid-gate separating the passenger compartment and the cargo area, the window having a first end section and a second end section having a mid-point that is opposite the first end section, the second end section being arranged adjacent the mid-gate, wherein the first end section of the window is pivotally mounted relative to the passenger compartment, the window being shiftable between a closed configuration and an open configuration in the open position, the latch engages the mid-point of the second end section to secure the window in the open configuration.

17. The vehicle according to claim 16, wherein the mid-gate includes a first surface exposed to the passenger compartment and a second surface exposed to the cargo area, the mid-gate being pivotally connected relative to the cargo bed between a first position wherein the mid-gate separates the cargo area from the passenger compartment and a second position wherein the second surface forms part of the support surface.

18. The vehicle according to claim 17, wherein the mid-gate includes a first end and a second end that is opposite the first end, the second end being pivotally connected relative to the support surface through a hinge.

19. The vehicle according to claim 18, wherein the support surface includes a first end portion arranged at the passenger compartment and a second end portion, the second end of the mid-gate being pivotally connected to the first end portion of the support surface.

20. The vehicle according to claim 19, wherein the hinge comprises a piano hinge connecting the second end of the mid-gate with the first end portion of the support surface.

\* \* \* \* \*